US010075825B2

(12) United States Patent
Egan et al.

(10) Patent No.: US 10,075,825 B2
(45) Date of Patent: Sep. 11, 2018

(54) DETERMINING VISIBILITY OF GROUP CONTENT TO A USER BASED ON INFERRED CONNECTIONS BETWEEN USERS OF AN ONLINE SYSTEM

(71) Applicant: Facebook, Inc., Menlo Park, CA (US)

(72) Inventors: John David Egan, London (GB); Lars Eilstrup Rasmussen, San Francisco, CA (US); Fabio Lopiano, London (GB)

(73) Assignee: Facebook, Inc., Menlo Park, CA (US)

( * ) Notice: Subject to any disclaimer, the term of this patent is extended or adjusted under 35 U.S.C. 154(b) by 315 days.

(21) Appl. No.: 15/046,346

(22) Filed: Feb. 17, 2016

(65) Prior Publication Data

US 2017/0237810 A1    Aug. 17, 2017

(51) Int. Cl.
| | | |
|---|---|---|
| G06F 15/16 | (2006.01) | |
| H04W 4/21 | (2018.01) | |
| H04L 29/08 | (2006.01) | |
| G06Q 50/00 | (2012.01) | |

(52) U.S. Cl.
CPC ............. *H04W 4/21* (2018.02); *H04L 67/306* (2013.01); *G06Q 50/01* (2013.01)

(58) Field of Classification Search
USPC .................................. 709/204, 217, 223, 224
See application file for complete search history.

(56) References Cited

U.S. PATENT DOCUMENTS

| | | | |
|---|---|---|---|
| 7,539,697 B1 | 5/2009 | Akella et al. | |
| 9,756,006 B2 * | 9/2017 | Shapero | ................... H04L 51/26 |
| 2004/0088325 A1 | 5/2004 | Elder et al. | |
| 2009/0265431 A1 | 10/2009 | Jania et al. | |
| 2010/0257023 A1 | 10/2010 | Kendall et al. | |
| 2011/0055333 A1 | 3/2011 | Guy et al. | |
| 2012/0328163 A1 * | 12/2012 | Panzer | .............. G06F 17/30244 382/115 |
| 2014/0006400 A1 | 1/2014 | Bastide et al. | |
| 2014/0032659 A1 | 1/2014 | Marini et al. | |
| 2014/0149507 A1 | 5/2014 | Redfern et al. | |

(Continued)

FOREIGN PATENT DOCUMENTS

KR    10-2015-0026071 A    3/2015

OTHER PUBLICATIONS

PCT International Search Report and Written Opinion, PCT Application No. PCT/US2016/035493, dated Aug. 31, 2016, thirteen pages.

*Primary Examiner* — Lan-Dai T Truong
(74) *Attorney, Agent, or Firm* — Fenwick & West LLP

(57) ABSTRACT

An online system allows users to join groups and interact with other members of group that they have joined. The online system identifies relationships between users in an organization using information about the users, such as roles and connections from an organizational chart. The online system establishes inferred connections between the users based on information from the organizational chart. The online system then determines whether to make group content visible to a user by applying visibility criteria for a group to the inferred connections between a user and members of the group, if any. Depending on this determination, groups are then made visible to certain users by presenting content associated with the group to the user.

20 Claims, 6 Drawing Sheets

(56) References Cited

U.S. PATENT DOCUMENTS

| | | |
|---|---|---|
| 2015/0100683 A1 | 4/2015 | Chung et al. |
| 2015/0142584 A1 | 5/2015 | Liu et al. |
| 2015/0169744 A1 | 6/2015 | Walkingshaw et al. |
| 2015/0248739 A1* | 9/2015 | Schulman .......... G06Q 50/2053 434/322 |
| 2016/0092576 A1 | 3/2016 | Quercia et al. |
| 2016/0292161 A1* | 10/2016 | Liu .................... G06Q 10/1053 |

* cited by examiner

DETERMINING VISIBILITY OF GROUP CONTENT TO A USER BASED ON INFERRED CONNECTIONS BETWEEN USERS OF AN ONLINE SYSTEM

BACKGROUND

This invention relates generally to online system and more specifically to determining visibility of groups in an online system to users of the online system.

Online systems enable users to generate and join groups, which allow users with common characteristics to share content with other users who are also members of the group. For example, groups can be created for users who living in a certain geographic location, users who went to the same school, or users who share a common interest such as sports, art, music, etc. A user who is a member of a group can view content that is associated with that group, though viewing content may be restricted for users who are not members of the group.

Conventionally, online systems select content for presentation to a user based on measures of relevance between the user and the content. If a user is a member of a group, the online system may select content associated with a group to present to the user. An online system may determine whether to show group content to a user based on the length of time the user has been a member of the group, the number of other group members with which the user is connected, and properties of the content itself.

A user may have interest in a group of which they are not a member. For example, the user might be interested in joining the group or in content associated with the group. However, in conventional online systems, the group may not be made visible to the user because the user is not a member of the group, so the user who may be interested in the group may not even know the group exists. In addition, if the user does not have many connections to users or groups in the online system, the online system may have difficulty determining content to present to a user. These problems are further complicated by restrictions that prevent users who are not members of the group from viewing content associated with the group.

SUMMARY

An online system provides a social networking environment for users of the online system. In some embodiments, some or all of the users may be members of an organization or employees of a company. The online system allows users to establish connections with other users of the online system. The online system also allows users to create and join groups, thereby becoming members of the group in the social networking environment. Users who are members of a group may then share content with other members of the group within an interface for the group provided by the system.

If a user is not a member of a group, the online system determines whether to make the group "visible" to the user within the social networking environment. A group is "made visible" to a user when the online system presents content associated with the group to the user. For example, a group profile or content items associated with the group may be presented to the user to make a group visible, such as when the user searches for groups in a search interface of the social networking system. Content items from a group may also be made visible to a user by including them in a feed of content provided to the user, such as a newsfeed, which contains content items about the user's connections or other items of likely interest to the user.

The system may determine whether to make a group visible to a particular user in a number of ways. In one embodiment, the system generates an inferred connection between the user and other users of the system, some of whom may be members of the group. The inferred connections are determined, at least in part, based on an organizational chart provided to the online system that describes relationships among the users of the system. The inferred connection between the user and another user may further be determined based on a measure of affinity of the user for the other user, and the online system may use a threshold for the measure of affinity to determine whether to establish an inferred connection.

The online system then applies visibility criteria that allows or restricts whether a group can be presented or otherwise made visible to a particular user. In particular, the visibility criteria of a group may restrict whether users who are not members of the group can view content in the group or the group itself. In some embodiments, the visibility criteria for a group comprise a set of rules that determine visibility according to the inferred connections obtained from the organizational chart. For example, a group relating to a secret project within a company may only be made visible to users who work on the project and kept invisible to others. In some embodiments, the properties of a group allow a group to be made partially visible. For example, the group may come up in search results, but it might be that the content items associated with the group may not be made visible.

If the user meets the visibility criteria of the group, then the online system makes the group visible to the user. A group can be made visible to a user through many means, such as by presenting content items associated with the group to the user in a newsfeed, presenting the group profile as a search result in response to a search query, and presenting the group as a suggestion for groups the user may want to join.

DETAILED DESCRIPTION

System Architecture

Figure 1:
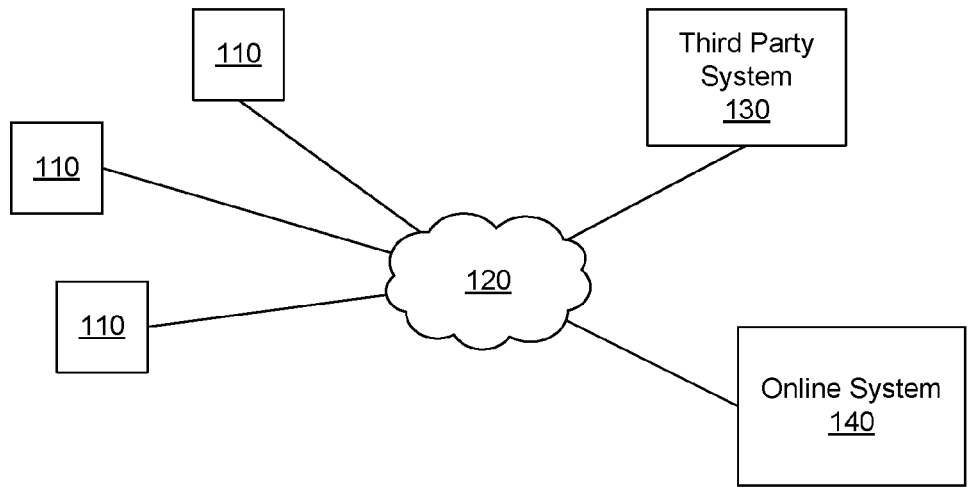
FIG. 1 is a block diagram of a system environment in which an online system operates, in accordance with an embodiment.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
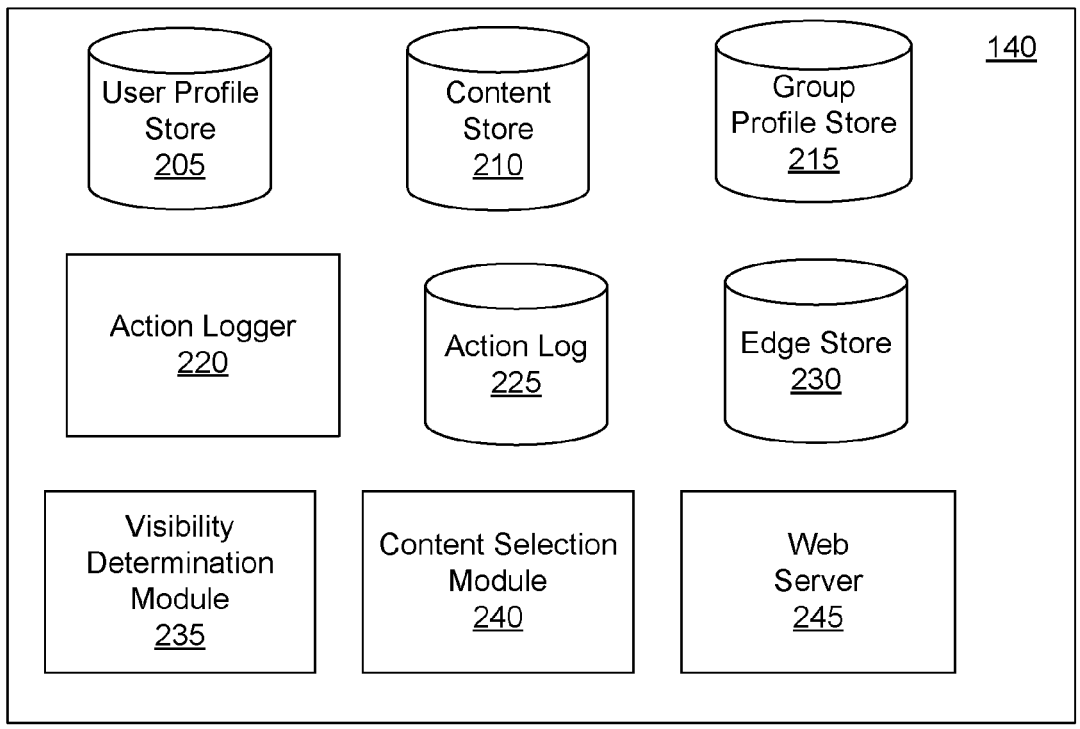
FIG. 2 is a block diagram of an online system, in accordance with an embodiment.

FIG. 2 is an example block diagram of the social networking system 140. The social networking system 140 shown in FIG. 2 includes a user profile store 205, a content store 210, a group profile store 215, an action logger 220, an action log 225, an edge store 230, an visibility determination module 235, a content selection module 240, and a web server 245. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 225.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

In some embodiments, the user profile store 205 stores information identifying a set of users of the online system 140. For example, the user profile store 205 receives information identifying users who are members of an organization (e.g., a bowling league, a company, a charity, etc.). The set of users may change over time as membership in the organization changes, so users may be removed from the set or included in the set over time. For example, online system users who are employees of a company may change over time as new employees are hired by the company and as existing employees leave the company, so the user profile store 205 may receive modifications to the set of users over time, allowing the user profile store 205 to maintain current information identifying the set of users. The information identifying the set of users includes information used by the user profile store 205 to identify a user in the set (e.g., a username, an e-mail address, or a user identifier associated with the user by the online system 140) or information associated with the user capable of allowing the online system 140 to identify the user (e.g., the user's name, a user identification number, a profile picture). The user profile store 205 stores the information identifying the set of users and may associate information with users in the set identifying the organization of which the users are members. For example, user profile store 210 stores an identifier of a law firm at which a user works in the user profile of the user and stores information identifying users who work at the law firm in association with the identifier of the law firm.

In some embodiments, when the set of users of the online system 140 is associated with an organization, the user profile store 205 receives an organizational chart identifying relationships between users who are members of the organization. The organizational chart identifies relationships between a set of users included in the organization, such as a hierarchy of users. In various embodiments, the organization provides the organizational chart to the online system 140, which stores the organizational chart in the user profile store 205 in association with the organization. The organizational chart received from the organization may include information used user profile store 205 to identify the set of users included in the organization (e.g., usernames associated with users by the online system 140) or information allowing the user profile store 205 identify the users (e.g., e-mail addresses). For example, an organizational chart for a non-profit animal shelter describes relationships of paid employees (e.g., veterinarians, animal technicians, etc.) to each other and to volunteers, as well as the names and positions of each employee and volunteer. In some embodiments, the user profile store 205 retrieves the organizational chart for an organization from a source associated with the organization (e.g., a website associated with the company) or from another suitable source. In some embodiments, some or all information relating to the organizational chart is stored in the edge store 230.

The content store 210 stores objects that each represents various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups, or applications. In some embodiments, objects are received from third-party applications or third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140.

The group profile store 215 stores information relating to groups in group profiles. Group profiles contain information such as the group's name, a description of the group, and preferences or settings for the group. A group profile in the group profile store 215 can store references to content stored by the online system, such as content items associated with the group, references to edges representing group members, and references to actions representing interactions from users with content associated with the group. In some embodiments, a group profile stores references to users that perform specific roles for the group. For example, a user can perform the role of an administrator of the group where the user is responsible for modifying information related to the group, assigning roles to other users in the group, approving users to join the group, or removing members from the group. In some embodiments, a group profile stores references to edges in the edge store 230 to users that perform the roles in the group and the edge stores information designating the user as having the role. In some embodiments, the functionality of the group profile store 215 can be performed by the content store 210.

A group profile in the group profile store 215 stores the criteria for a user to join a group. A group's criteria may allow any user to join the group freely. Some groups may require a member of the group or a user with a role in the group to approve a user as a new member before the user can join. In some embodiments, a group's membership criteria are dependent on an organizational chart. For example, the organizational chart may cause a user to be automatically added to a group, prevent a user from leaving a group, or prevent a user from joining a group. In some embodiments, the group profile store 215 stores visibility criteria for a group. Visibility criteria are rules that analyze connections and characteristics of a user to determine whether to make a group visible to the user. In some embodiments, visibility criteria are set by a user with a role in the group. Visibility criteria are discussed further below.

The action logger 220 receives communications about user actions internal to and/or external to the social networking system 140, populating the action log 225 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 225.

The action log 225 may be used by the social networking system 140 to track user actions on the social networking system 140, as well as actions on third party systems 130 that communicate information to the social networking system 140. Users may interact with various objects on the social networking system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 225 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 225 may record a user's interactions with advertisements on the social networking system 140 as well as with other applications operating on the social networking system 140. In some embodiments, data from the action log 225 is used to infer interests or preferences of a user, augmenting the interests included in the user's user profile and allowing a more complete understanding of user preferences.

The action log 225 records a user's interactions with a group on the social networking system. Examples of actions a user can take to interact with a group include joining the group, posting content in the group, interacting with content associated with the group, and inviting other users to join the group. If a user performs a role in the group, the action log 225 may record actions associated with that role, such as the user adding a new member to the group or editing content associated with the group.

The action log 225 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 225 may record information about actions users perform on a third party system 130, including webpage viewing histories, advertisements that were engaged, purchases made, and other patterns from shopping and buying.

In one embodiment, an edge store 230 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 230 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 230, in one embodiment. Alternatively, each interaction between a user and a specific object is stored as a separate edge. In some embodiments, connections between users may be stored in the user profile store 205, or the user profile store 205 may access the edge store 230 to determine connections between users.

The edge store 230 stores edges between a user and a group, representing a connection between the user and the group. An edge can represent an established connection between the user and the group, meaning that the user is a member of the group. The edge can store information about the user's membership in the group, such as if the user has a special role, how often they post in the group, how often they interact with content in the group, if they have invited people to join the group and the amount of time since they last interacted with the group.

The visibility determination module 235 determines whether a group should be made visible to a user of the online system 140 using visibility criteria. Visibility criteria are rules that analyze a user's connections and characteristics to determine whether a group should be made visible to the user—i.e., whether the online system 140 can present content associated with the group to the user. The visibility criteria may prevent the online system 140 from making the group visible to certain users in the online system 140. For example, visibility criteria may prevent the online system from making a group visible to a user if that user is not high enough in the hierarchy of an organizational chart provided to the online system 140.

A group can be made visible to a user in many ways, such as presenting content associated with the group in the user's newsfeed, presenting the group as a result to a search query, and providing a suggestion to the user to join the group. In some embodiments, the visibility criteria allow a group to be made visible to a user in some ways, but may restrict the group from being made visible in others. For example, the visibility criteria may allow a group to be made visible in search results presented to a user, but may restrict content items associated with the group to appear in the user's newsfeed. In some embodiments, the visibility criteria require different rules to be met for different ways of making a group visible to a user. For example, the visibility criteria may require a user to have at least two connections with group members for the group to be presented in search results, and at least five connections with group members for content associated with the group to be presented in a newsfeed. In some embodiments, the visibility criteria of a group will allow only a portion of the content associated with the group to be made visible to the user. For example, the visibility criteria of a group may allow a user to view the group profile associated with the group, but not content items associated with the group.

In some embodiments, the visibility criteria for a group use inferred connections between users in the online system 140 to determine whether to make a group visible to a user. Inferred connections are connections that are generated by the online system 140 and represent connections between users of the online system 140 that have not been established by the users. In some embodiments, inferred connections are generated based on an organizational chart provided to the online system 140. For example, an inferred connection may be generated between two users if the users are on the same team in an organization or if one user manages another user. In some embodiments, inferred connections are generated based on a measure of affinity between the users. Generating inferred connections between users is further described in U.S. patent application Ser. No. 14/750,524, filed on Jun. 25, 2015, which is hereby incorporated by reference in its entirety.

The visibility determination module 235 uses established connections and inferred connections between users to determine whether to make a group visible to a user. In some embodiments, the visibility determination module 235 makes a group visible to a user based on a threshold for a number of connections between the user and members of the group. For example, the group may be made visible to a user if the user has connections with at least some number or some percentage of the group members. The visibility determination module 235 may make a group visible to a user based on characteristics of connections between the user and group members. In some embodiments, the visibility criteria may distinguish between established connections and inferred connections between users, and in other embodiments, the visibility criteria do not distinguish between established connections and inferred connections.

In some embodiments, the visibility criteria use a measure of affinity of a user of the online system 140 for a group to determine whether to make the group visible to the user. The visibility criteria may use a measure of affinity of a user of the online system 140 for a group to determine whether to make the group visible to the user. The measure of affinity of a user for a group can be based at least in part on characteristics associated with the user and group. Example characteristics associated with a user and a group may include: the user profile associated with the user having similar characteristics to the group profile associated with the group, the user having connections with members of the group, the user being a member of a different group that has users that are members of both groups, the user posting content items in the group, the user interacting with content items posted in the group or content items similar to content posted in the group, high measures of affinity between the user and members of the group, and the group being associated with a third party that is also associated with content with which the user has interacted. In some embodiments, the visibility criteria makes a group visible to a user if the measure of affinity of the user for the group equals or exceeds a threshold value; however, if the measure of affinity of the user for the group is less than the threshold value, the visibility determination module 235 does not make the group visible to the user.

The content selection module 240 selects one or more content items for communication to a client device 110 to be presented to a user. Content items eligible for presentation to the user are retrieved from the content store 210 or from another source by the content selection module 240, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 240 includes content items eligible for presentation to the user in one or more selection processes, which identify a set of content items for presentation to the viewing user. Based on the measures of relevance, the content selection module 240 selects content items for presentation to the user. In some embodiments, the content selection module 240 selects content items having the highest measures of relevance or having at least a threshold measure of relevance for presentation to the user. In some embodiments, the content selection module 240 ranks content items based on their associated measures of relevance and selects content items having the highest positions in the ranking or having at least a threshold position in the ranking for presentation to the user.

The content selection module 240 also computes measures of relevance of a user for groups and content items associated with groups to determine whether to make the group visible to the user. A group or content items associated with a group are eligible for presentation to a user of the online system 140 if the visibility criteria for the group allow the group to be made visible to the user. If group content is eligible to be presented to a user, the content selection module 240 will determine whether to present the group content based on the measure of relevance of the group content to the user. In some embodiments, the content selection module 240 computes the measure of relevance of a group or a content item associated with a group based on measures of affinity of the user for the group. In some embodiments, the group content can be presented to the user in a newsfeed, as a search result, or as a suggestion for groups to join.

In some embodiments, the content selection module 240 provides the content to the user through a social networking environment provided by the online system 140. The social networking environment allows users of the online system 140 to establish connections to each other and to communicate with each other. The social networking environment also allows users to join groups stored by the group profile store 215. A user joining a group establishes a connection in the edge store 230 between the group and the user. After joining a group, the user may post content in the group and view content posted in the group by other group members. A user who is a member of a group can also interact with content in the group (e.g., providing a comment on the content, displaying approval ["liking"] the content, sharing the content with other users, etc.). The social networking environment provided to the set of users may also allow the users to perform additional actions with each other and with objects on the online system 140. Example actions that a user may perform via the social networking environment include: creating a user profile associated with the user by the user profile store 205 and including information describing the user (e.g., profile picture, geographic location, interests, etc.); posting content to a page associated with a user profile (e.g., pictures, status updates, check-ins, etc.); establishing connections with other users that parallel the users' real-life relationships (e.g., friendships, co-workers, family members, etc.); communicating with other users (e.g., via sharing content, exchanging messages, etc.); receiving content selected for the user by the online system 140 (e.g., a feed describing actions performed by additional users to which the user is connected); and establishing connections with objects maintained by the online system 140 (e.g., indicating a preference for a page maintained by the online system 140, joining a group maintained by the online system 140, etc.).

The web server 245 links the online system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that is stored in the content store 210. Additionally, the web server 245 may provide application programming interface (API) functionality to send data directly to native client device operating systems.

Determining Whether to Make a Group Visible to a User

Figure 3:
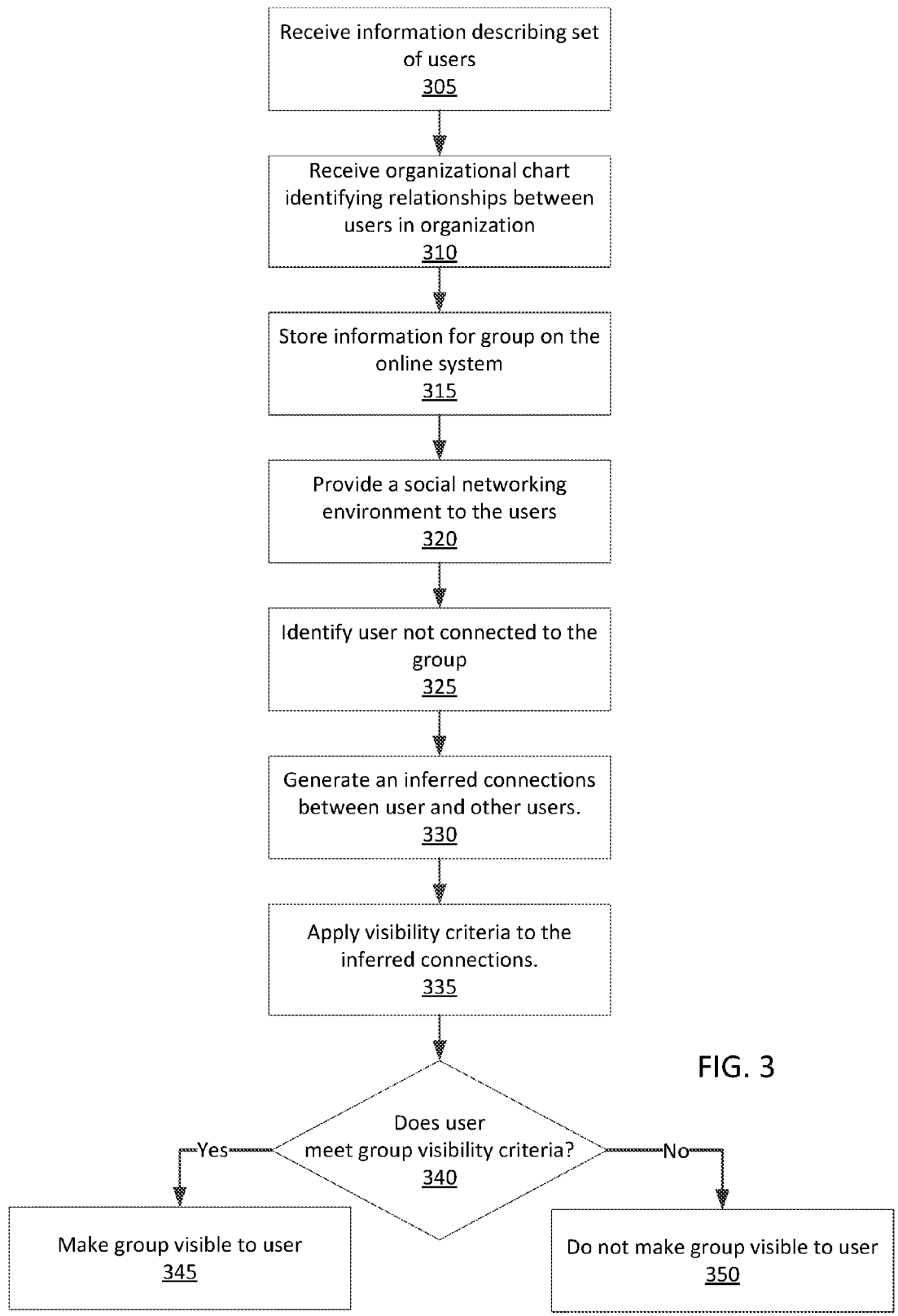
FIG. 3 is a flowchart of a method for determining whether to make a group visible to a user based on inferred connections and visibility criteria.

FIG. 3 is a flowchart of a method for determining whether to make a group visible to a user based on inferred connections and visibility criteria. In other embodiments, the method may include different and/or additional steps than those shown in FIG. 3. Additionally, steps of the method may be performed in different orders than the order described in conjunction with FIG. 3 in various embodiments.

The online system 140 receives 305 information identifying a set of users of the online system 140. In some embodiments, the online system 140 receives 305 information identifying users who are members of an organization (e.g., a bowling league, a company, a charity, etc.). The set of users may change over time as membership in the organization changes, so the online system 140 may receive 305 information adding or removing users from the set of users. The information identifying the set of users includes information used by the online system 140 to identify a user in the set or information associated with the user capable of allowing the online system 140 to identify the user. Additionally, the online system 140 receives 310 an organizational chart identifying relationships between users who are members of the organization. The organizational chart may identify one or more hierarchical relationships between users who are members of the organization, roles of users within the organization, or other relationships between users who are associated with the organization. In various embodiments, the organizational chart includes information identifying a user and identifying relationships between the user and other users who are members of the organization.

The online system 140 stores 315 content associated with one or more groups. The group is associated with a group profile, which contain information relating to the group such as the group's name, a description of the group, and preferences or settings for the group. A group can be associated with content items generated by users of the online system 140, actions representing users interacting with the group, and connections to users representing users who are members of the group.

The online system 140 provides 320 a social networking environment to the set of users, allowing the set of users of the online system 140 to join other groups, post content in the group, and view content posted by other group members in the group. A user who is a member of a group can also interact with content items and other group members within an environment provided by the online system for the group.

The online system 140 identifies 325 a user in the set of users who is not a member of the group and generates 330 inferred connections between the identified user and other users of the online system 140. In some embodiments, the inferred connections are generated based on the organizational chart received 310 by the online system 140. For example, the online system 140 may generate 330 an inferred connection between the identified user and a user of the online system that is on the same team in the organization as the identified user. Visibility criteria are applied 335 to the inferred connections to determine 340 if the group should be made visible to the identified user. The visibility criteria include rules that analyze a user's connections and characteristics to determine 340 whether a group should be made visible to the user. For example, visibility criteria may require that the user be connected with a threshold number of group members for the group to be made visible to the user.

If the user meets the visibility criteria of the group, then the group is made 345 visible to the user. In some embodiments, a group can be made 345 visible to the user by presenting group content to the user in a newsfeed, by presenting the group as a result to a search query, or by presenting the group as a suggested group for the user to join. If the user does not meet the visibility criteria, then the online system does not make 350 the group visible to the user.

Example Organizational Chart

Figure 4:
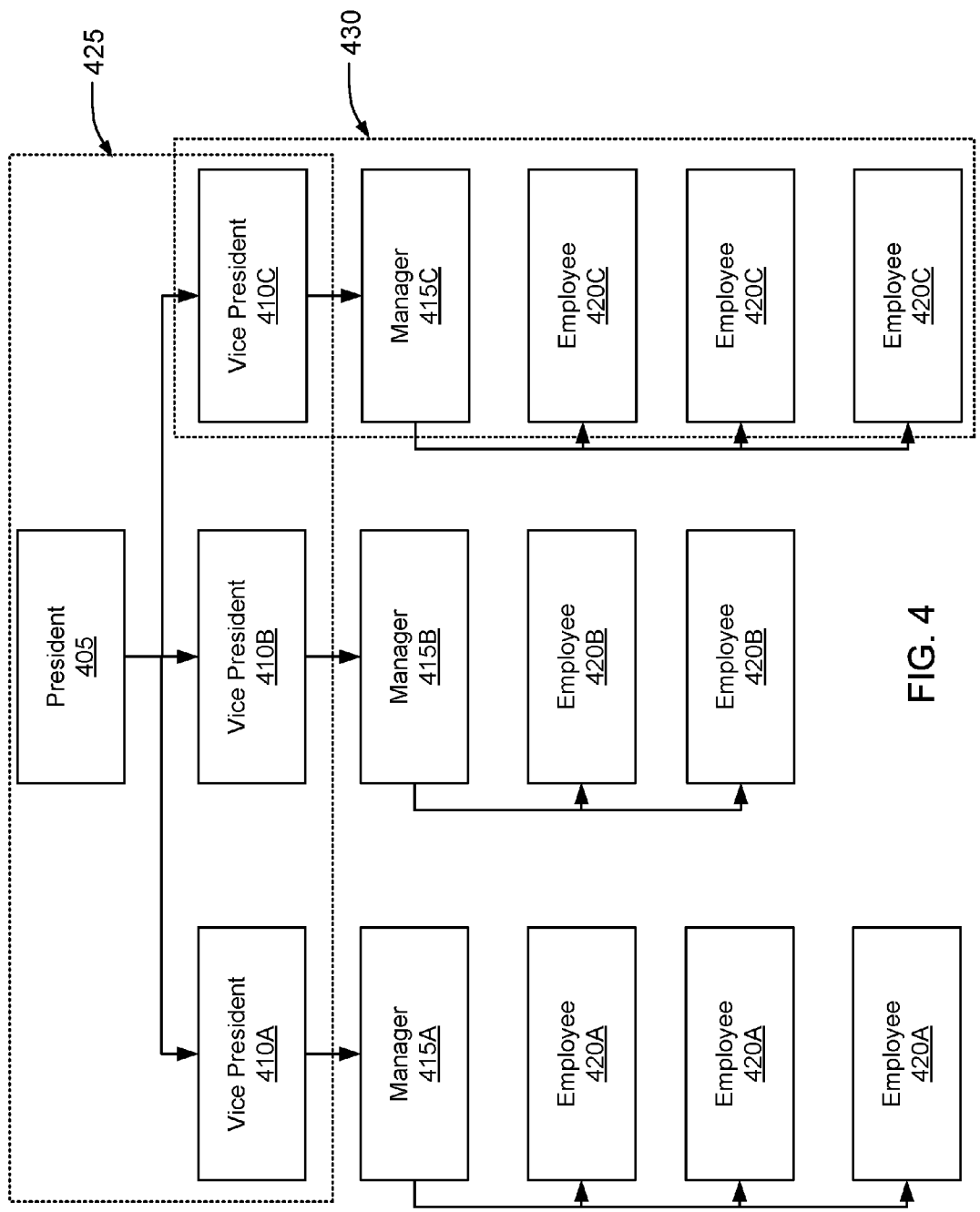
FIG. 4 is an example organizational chart describing relationships between a set of users of an online system, in accordance with an embodiment.

FIG. 4 is an example organizational chart describing relationships between a set of users of an online system, in accordance with an embodiment. The relationships identified by the organizational chart in FIG. 4 are defined by an individual's role in the organization. In various embodiments, the organizational chart organizes individuals as a hierarchy, as a matrix, or as any other suitable representation. The organizational chart may include information identifying individuals included in the organization who are users of the online system 140 (e.g., a username associated with users of the online system 140 by the online system 140). Additionally, the organizational chart associates information identifying a user's role or position with the organization and relationships with one or more other users with information identifying users of the online system 140. In the example, of FIG. 4, the organizational chart identifies a president 405 of the organization, vice presidents 410 of the organization, managers 415 of the organization, and employees 420 of the organization. The organizational chart also associates information identifying an individual associated with a position in the organization. For example, the organizational chart includes a name, a profile picture, and contact information associated with the president 405. If the president is a user of the online system 140, the organizational chart may include information used by the online system 140 to identify the user (e.g., a username or user identifier associated with the user by the online system 140).

The organizational chart identifies relationships between individuals, including a set of online system users, included in the organization, allowing the organizational chart to describe the structure of the organization. For example, the organizational chart identifies the ranks of different users in the organization relative to each other. In the example of FIG. 4, the organizational chart includes connections between individuals based on relationships between the roles or positions of the individuals within the organization. For example, the organizational chart in FIG. 4 identifies relationships between the president 405 and the vice presidents 410 to indicate the vice presidents 410 report to the president 405. Similarly, the organizational chart in FIG. 4 identifies relationships between each vice president 410 and managers 415 who report to each vice president 410. As another example, the organizational chart in FIG. 4 identifies relationships between different managers 415 and employees 420 who report to each of the different managers 415.

The organizational chart can also identify different branches or departments of the organization. In the embodiment illustrated in FIG. 4, each vice president 410 is responsible for a branch of the organization. For example, vice president 410A may manage the marketing department for a company, and manager 415A and employees 420 work in the marketing department. The relationships identified by the organizational chart may be unidirectional (e.g., identifying a superior-subordinate relationship) or bidirectional (e.g., indicating a co-worker relationship). Different organizational charts may describe relationships among individuals belonging to various types of organizations. Example organizations include: business organizations (e.g., companies), government organizations (e.g., military forces and government agencies), private organizations (e.g., private schools and sports leagues), religious organizations, and nonprofit organizations (e.g., charities).

FIG. 4 also illustrates ways groups can be formed based on the organizational chart. Groups can be formed based on hierarchical roles in the organization or based on a branch/department of the organization. For example, group 425 is based on hierarchical roles in the organization and comprises the president 405 and the vice presidents 410. Group 425 could represent a group for executives in the organization that the president 405 and the vice presidents 410 use to communicate. Group 430 is based on a branch/department and comprises vice president 410C, manager 410C, and employees 410C. Group 430 could represent a group in the engineering department in a company for a special project and is used by the engineers working on the project to communicate.

In some embodiments, a group's joining criteria may be based on the organizational chart. For example, managers 415 and employees 420 may be prohibited from joining group 425, because they are not high enough in the organization's hierarchy. As another example, vice presidents 410A and 410B, managers 415A and 415B, and employees 420A and 420B may be prohibited from joining group 430, because they are not working on the project. In some embodiments, a group's visibility criteria may be based on the organizational chart. For example, group 425 may not allow managers 415 and employees 420 to see the content posted in the group 425, because the president 405 and vice presidents 410 are discussing sensitive topics in the group 425. As another example, the online system 140 may not show the group 430 at all to vice presidents 410A and 410B, managers 415A and 415B, and employees 420A and 420B, because the project for group 430 is very secret. In some embodiments, a group's visibility criteria may be based on both the user's hierarchical position in the organizational chart and which branch/department of the organizational chart the user is in.

Figure 5:
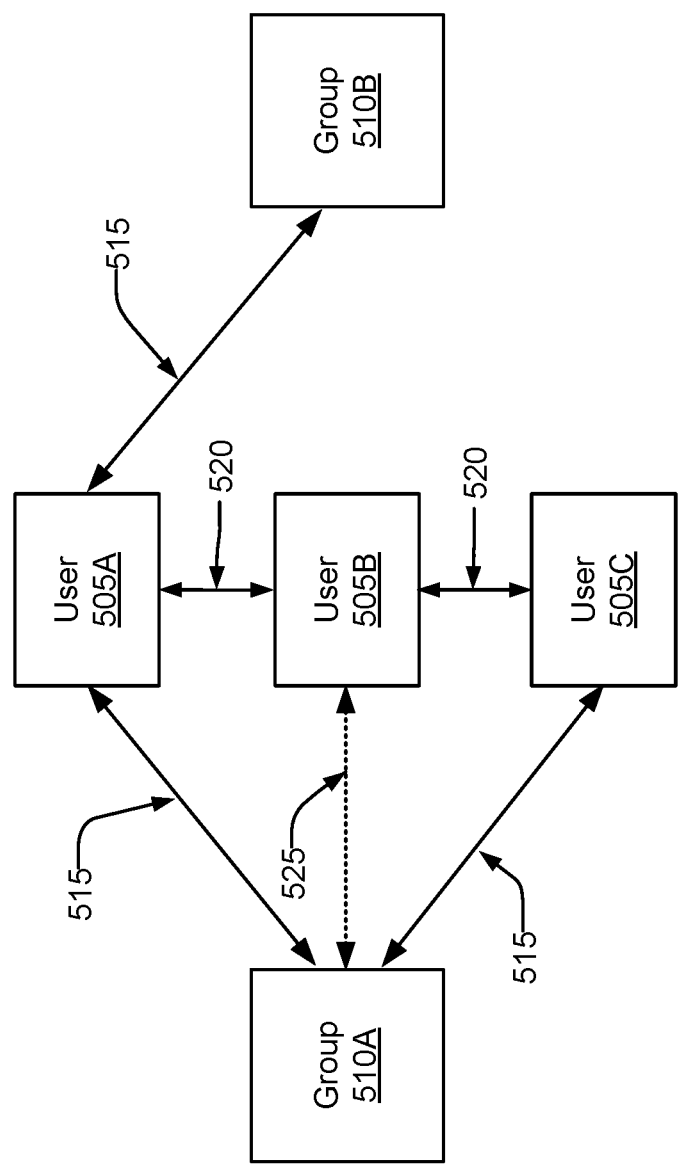
FIG. 5 is a block diagram illustrating established connections and inferred connections between users and applying visibility criteria, in accordance with an embodiment.

Generating Inferred Connections Between Users and Applying Visibility Criteria Thereto FIG. 5 is a block diagram illustrating inferred connections between users and applying visibility criteria, in accordance with an embodiment. In the embodiment shown in FIG. 5, the users 505 are in a set of users provided to the online system 140. User 505B has inferred connections 520 with user 505A and user 505C. User 505A is a member of both group 510A and group 510B and therefore has connections 515 with group 510A and group 510B. User 505C is a member of group 510A and therefore has a connection 515 with group 510A.

The online system 140 identifies user 505B as a user that is not a member of group 510A and applies visibility criteria to user 505B for group 510A. In the example shown in FIG. 5, user 505B meets the visibility criteria due to having inferred connections 520 with users 505A and 505C, who have connections 515 with group 510A. Therefore, the online system 140 makes group 510A visible 525 to user 505B. In another example presented by FIG. 5, the online system applies visibility criteria to user 505C for group 510B. User 505C does not have a connection to a user who is a member of group 510B; therefore, the online system 140 does not make group 510B visible to user 505C.

Examples of Making a Group Visible to a User

Figure 6:
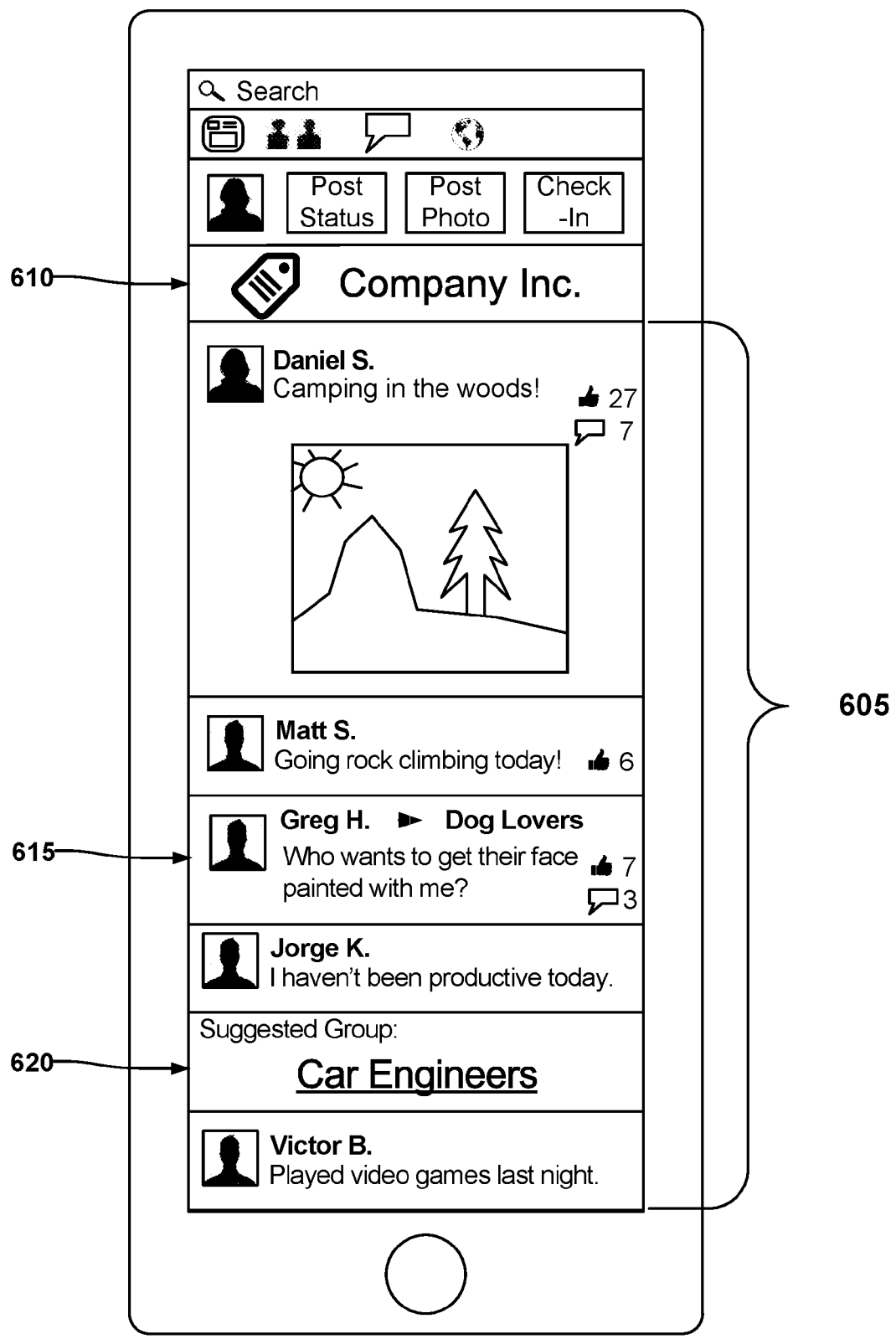
FIGS. 6 and 7 are line drawings of screenshots illustrating groups being made visible to a user, in accordance with an embodiment.
Figure 7:
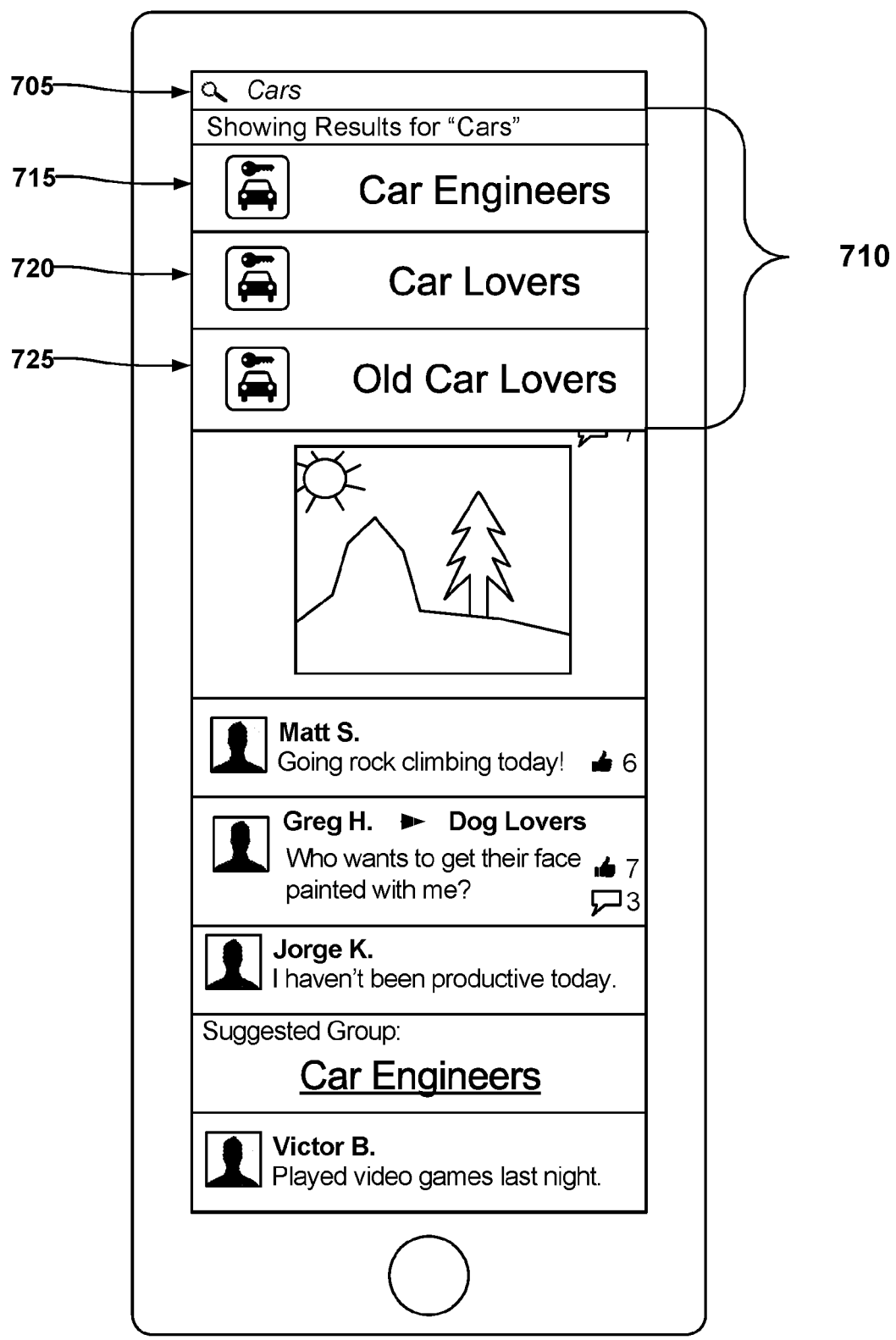

FIGS. 6 and 7 are line drawings of screenshots illustrating groups being made visible to a user through a social networking environment, in accordance with an embodiment. In the embodiment illustrated in FIGS. 6 and 7, the social networking environment provided by the online system 140 is provided through an application on a mobile device, like a smartphone or a tablet. In other embodiments, the social networking environment can be presented through a web browser on a computer.

Referring to FIG. 6, a newsfeed 605 of content items is presented to the user. In the embodiment presented by FIG. 6, the content items being presented are associated with users in the set of users provided to the online system 140. The content items selected for presentation are selected based on measures of relevance of the content item for the user. A company name and logo 610 for a company associated with the set of users is presented with the social networking environment.

The online system 140 can make a group visible to a user by providing content associated with the group to the user. In the embodiment illustrated in FIG. 6, the online system 140 will only make a group visible to a user if the group's visibility criteria allow the group to be made visible to the user. In the example shown in FIG. 6, the "Dog Lovers" group is made visible to the user 615, meaning that the visibility criteria of the "Dog Lovers" allow the group to be made visible to the user. The "Dog Lovers" group is made visible to the user by displaying a content item associated with the group 615 to the user. The content item is a post by a user posing a question to the group. In other embodiments, the content item could be a picture, a video, a link, or any other content item stored by the online system 140. A group can also be made visible through a suggestion by the online system 140 for the user to join a group. For example, the "Car Engineers" group is presented to the user 620 as a suggested group for the user to join. The online system 140 uses measures of relevance for groups to determine which groups would be most relevant to present to the user. For example, the online system 140 selected the "Dog Lovers" group and the "Car Engineers" group because the user has shown some interest in dogs and cars through their activities on the online system 140. A group can be made visible to the user based on the organizational chart provided to the online system 140. For example, the "Car Engineers" group may have been made visible to the user because the user works in the engineering department of a company.

As illustrated in FIG. 7, a group can also be made visible to a user through search results presented to the user. FIG. 7 shows a search query 705 from the user for "cars." The social networking environment provided by the online system 140 provides search results 710 to the user. In the example shown in FIG. 7, only groups are shown as search results 710. In other embodiments, any object stored by the online system 140 can be presented as a search result, such as groups, user profiles, events, pages, etc. The search results 710 presented are determined by the online system to be relevant to the user and to the search query. In some embodiments, the results 710 are displayed in order of relevance to the user. For example, the "Car Engineers" group 715, the "Car Lovers" group 720, and the "Old Car Lovers" 725 group are presented because they are relevant to the search query. In some embodiments, the relevance of search results 710 are determined based on the organizational chart provided to the online system 140. For example, if the user is an engineer in the company represented by the organizational chart, then the "Car Engineers" group 715 may be determined to be more relevant to the user than the "Car Lovers" group 720.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving information identifying a plurality of users of an online system, the information including a plurality of use profiles, wherein each user profile of the plurality of user profiles is associated with a user of the plurality of users;
    receiving information describing an organizational chart for an organization, the organizational chart indicating connections among the plurality of users defined by each user's role in the organization;
    storing a group on the online system;
    providing a social networking environment to the plurality of users, the social networking environment enabling the plurality of users to establish connections with the group;
    identifying one or more users of the plurality of users that are not connected to the group;
    generating a set of inferred connections between the identified one or more users and one or more other users of the online system, wherein the one or more other users of the online system have roles in the organization, and wherein the inferred connections are based at least in part on the received information describing the organizational chart;
    applying a set of visibility criteria to the inferred connections between the identified one or more users and one or more other users of the online system that are connected to the group;
    determining whether to make the group visible to the identified one or more users based on the applying; and
    in response to determining to make the group visible to the identified one or more users, presenting content associated with the group to the identified one or more users through the social networking environment.

2. The method of claim 1, wherein determining whether to make the group visible to the identified one or more users is further based on one or more measures of affinity of the identified one or more users for the group, the one or more measures of affinity computed based on one or more indicators associated with the identified one or more users and the group.

3. The method of claim 2, wherein computing the measure of affinity of the identified one or more users for the group comprises:
    determining values for each of the one or more indicators based on information associated with the identified one or more users and with the group by the online system;
    associating weights with each of the one or more indicators, a weight associated with an indicator based at least in part on a likelihood that the indicator indicates interest in the group by a user of the identified one or more users; and
    computing the one or more measures of affinity for the identified one or more users for the group based at least in part on the values associated with each of the one or more indicators and the weights associated with each of the one or more indicators.

4. The method of claim 1, wherein presenting content associated with the group to the identified one or more users comprises presenting a content item associated with the group to the identified one or more users.

5. The method of claim 1, wherein presenting content associated with the group to the identified one or more users comprises presenting the group as a result of a search query.

6. The method of claim 1, wherein presenting content associated with the group to the identified user comprises presenting a suggestion to the identified one or more users to join the group.

7. The method of claim 1, wherein applying the visibility criteria to the inferred connections is based on a rank of the identified one or more users in the organizational chart.

8. The method of claim 1, wherein applying the visibility criteria to the inferred connections is based on one or more positions of the identified one or more users in the organizational chart being in a particular branch of the organizational chart.

9. The method of claim 1, wherein applying the visibility criteria to the inferred connections is based on the identified one or more users being connected to a predefined number of other users of the plurality of users who are members of the group.

10. The method of claim 1, wherein applying the visibility criteria to the inferred connections is based on comparing characteristics of the identified one or more users and characteristics of the group.

11. The method of claim 1, wherein applying the visibility criteria to the inferred connections is based on a number of previous interactions of the identified one or more users with content related to the group.

12. The method of claim 1, wherein apply the visibility criteria to the inferred connections is based on the identified one or more users being connected to a predefined number of other users of the plurality of users who are members of the group.

13. The method of claim 1, wherein applying the visibility criteria to the inferred connections is based on comparing characteristics of the identified one or more users and characteristics of the group.

14. A computer program product comprising a non-transitory computer-readable storage medium having instructions encoded thereon that, when executed by a processor, cause the processor to:
receive information identifying a plurality of users of an online system, the information including a plurality of use profiles, wherein each user profile of the plurality of user profiles is associated with a user of the plurality of users;
receive information describing an organizational chart for an organization, the organizational chart indicating connections among the plurality of users defined by each user's role in the organization;
store a group on the online system;
provide a social networking environment to the plurality of users, the social networking environment enabling the plurality of users to establish connections with the group;
identify one or more users of the plurality of users that are not connected to the group;
generate a set of inferred connections between the identified one or more users and one or more other users of the online system, wherein the one or more other users of the online system have roles in the organization, and wherein the inferred connections are based at least in part on the received information describing the organizational chart;
apply a set of visibility criteria to the inferred connections between the identified one or more users and one or more other users of the online system that are connected to the group;
determine whether to make the group visible to the identified one or more users based on the applying; and
in response to determining to make the group visible to the identified one or more users, present content associated with the group to the identified one or more users through the social networking environment.

15. The computer program product of claim 14, wherein determining whether to make the group visible to the identified one or more users is further based on one or more measures of affinity of the identified one or more users for the group, the one or more measures of affinity computed based on one or more indicators associated with the identified one or more users and the group.

16. The computer program product of claim 14, wherein presenting content associated with the group to the identified one or more users comprises presenting a content item associated with the group to the identified one or more users.

17. The computer program product of claim 14, wherein presenting content associated with the group to the identified one or more users comprises presenting the group as a result of a search query.

18. The computer program product of claim 14, wherein the visibility criteria for the group are based on the organizational chart provided to the online system.

19. The computer program product of claim 14, wherein applying the visibility criteria to the inferred connections is based on a rank of the identified one or more users in the organizational chart.

20. The computer program product of claim 14, wherein applying the visibility criteria to the inferred connections is based on one or more positions of the identified one or more users in the organizational chart being in a particular branch of the organizational chart.

* * * * *

UNITED STATES PATENT AND TRADEMARK OFFICE
CERTIFICATE OF CORRECTION

PATENT NO. : 10,075,825 B2
APPLICATION NO. : 15/046346
DATED : September 11, 2018
INVENTOR(S) : John David Egan et al.

It is certified that error appears in the above-identified patent and that said Letters Patent is hereby corrected as shown below:

In the Claims

Column no: 16, Line(s): 5, Claim 1: "use profiles" to read as — user profiles —

Column no: 17, Line(s): 37, Claim 14: "use profiles" to read as — user profiles —

Signed and Sealed this
Seventh Day of May, 2019

Andrei Iancu
*Director of the United States Patent and Trademark Office*